United States Patent
Baughman et al.

(10) Patent No.: US 11,012,748 B2
(45) Date of Patent: May 18, 2021

(54) DYNAMICALLY PROVIDING CUSTOMIZED VERSIONS OF VIDEO CONTENT

(71) Applicant: INTERNATIONAL BUSINESS MACHINES CORPORATION, Armonk, NY (US)

(72) Inventors: Aaron K. Baughman, Silver Spring, MD (US); Jeff Amsterdam, Roswell, GA (US); Craig M. Trim, Ventura, CA (US); Christopher E. Holladay, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 16/135,296

(22) Filed: Sep. 19, 2018

(65) Prior Publication Data
US 2020/0092610 A1 Mar. 19, 2020

(51) Int. Cl.
*H04N 21/45* (2011.01)
*H04N 21/454* (2011.01)
(Continued)

(52) U.S. Cl.
CPC ... *H04N 21/4532* (2013.01); *H04N 21/23418* (2013.01); *H04N 21/4394* (2013.01);
(Continued)

(58) Field of Classification Search
CPC .......... H04N 21/4532; H04N 21/4542; H04N 21/23418; H04N 21/4394; H04N 21/4666;
(Continued)

(56) References Cited

U.S. PATENT DOCUMENTS

| 4,739,396 A | 4/1988 | Hyatt |
| 4,805,037 A | 2/1989 | Noble et al. |

(Continued)

OTHER PUBLICATIONS

Barradas, "Unobservable Covert Streaming for Internet Censorship Circumvention", Sep. 2016, 77 pages.
(Continued)

*Primary Examiner* — Anthony Bantamoi
(74) *Attorney, Agent, or Firm* — Nicholas Bowman; Andrew D. Wright; Roberts Calderon Safran & Cole, P.C.

(57) ABSTRACT

Systems and methods for dynamically providing customized versions of video content are disclosed. In embodiments, a method comprises: analyzing a video to determine content and context of portions of the video; assigning one or more content editing categories to the portions of the video based on the analyzing; determining an unwanted scene of the video based on the one or more content editing categories and user profile data of a viewer; determining a style component of the unwanted scene based on context of the unwanted scene and the user profile data; generating custom content to replace the unwanted scene of the video based on an acceptable portion of content corresponding to the unwanted scene and the style component; editing the video to replace the unwanted scene of the video with the custom content to produce an edited video including the custom content; and providing the edited video to the viewer.

20 Claims, 9 Drawing Sheets

(51) Int. Cl.
H04N 21/234 (2011.01)
H04N 21/439 (2011.01)
H04N 21/466 (2011.01)
H04N 21/6587 (2011.01)
H04N 21/4415 (2011.01)

(52) U.S. Cl.
CPC ..... *H04N 21/4415* (2013.01); *H04N 21/4542* (2013.01); *H04N 21/4666* (2013.01); *H04N 21/6587* (2013.01)

(58) Field of Classification Search
CPC ........... H04N 21/6587; H04N 21/4415; H04N 21/44218; H04N 21/42201; H04N 21/422
See application file for complete search history.

(56) References Cited

U.S. PATENT DOCUMENTS

| | | | |
|---|---|---|---|
| 6,362,850 | B1 | 3/2002 | Alsing et al. |
| 6,829,582 | B1 | 12/2004 | Barsness |
| 8,984,548 | B2 | 3/2015 | Blanchard et al. |
| 9,137,573 | B2 | 9/2015 | Nandi |
| 9,241,185 | B2 | 1/2016 | Howcroft et al. |
| 9,471,852 | B1* | 10/2016 | Ferris .................. G06F 17/3082 |
| 2006/0095262 | A1 | 5/2006 | Danieli |
| 2006/0130121 | A1* | 6/2006 | Candelore ............ H04N 7/7073 |
| 2009/0313546 | A1 | 12/2009 | Katpelly et al. |
| 2009/0328093 | A1 | 12/2009 | Cansler et al. |
| 2011/0153328 | A1 | 6/2011 | Lim et al. |
| 2015/0020086 | A1* | 1/2015 | Chen ................ H04N 21/44218 |

OTHER PUBLICATIONS

Disclosed Anonymously, "Censored Display Surface", Ip.com, Jan. 21, 2011, 4 pages.

Disclosed Anonymously, "Customizable Age-Appropriate Filter for Video Sequences", Ip.com, Dec. 21, 2017, 4 pages.

IBM, "Content-type based real-time video editing for broadcast systems", Ip.com, Oct. 26, 2007, 4 pages.

Disclosed Anonymously, "Image Moderation Using Machine Learning", Ip.com, Dec. 13, 2017, 35 pages.

Lew, "Optimal Conversion of Extended-Entry Decision Tables with General Cost Criteria", https://dl.acm.org/citation.cfm?id=359469, Magazine Communications of the ACM, vol. 21 Issue 4, Apr. 1978, pp. 269-279, 11 pages.

Lew, "On the Emulation of Flowcharts by Decision Tables", https://dl.acm.org/citation.cfm?id=358739, Magazine Communications of the ACM, vol. 25 Issue 12, pp. 895-905, Dec. 1982, 11 pages.

Owen, "Monte Carlo Extension Of Quasi-Monte Carlo", https://dl.acm.org/citation.cfm?id=293278, WSC '98 Proceedings of the 30th conference on Winter simulation, pp. 571-578, Dec. 13-16, 1998, 7 pages.

Nienhaus et al., "Depicting Dynamics Using Principles of Visual Art and Narrations", http://ieeexplore.ieee.org/document/1438257/, IEEE Computer Graphics and Applications, vol. 25, Issue: 3, Jun. 6, 2005, 12 pages.

Sutanto et al., "A scenario-based approach for smart system control and optimization", http://ieeexplore.ieee.org/document/8283459/, 2017 IEEE Green Energy and Smart Systems Conference (IGESSC), Nov. 6-7, 2017, 5 pages.

Idoniboyeobu, "Fault Location Prediction on Double-circuit Transmission Lines Based on the Hierarchical Temporal Memory", https://ieeexplore.ieee.org/document/8281973/, 2017 IEEE 3rd International Conference on Electro-Technology for National Development (NIGERCON), Nov. 7-10, 2017, 6 pages.

Colah's Blog, "Understanding LSTM Networks", http://colah.github.io/posts/2015-08-Understanding-LSTMs/, Aug. 27, 2015, 13 pages.

* cited by examiner

DYNAMICALLY PROVIDING CUSTOMIZED VERSIONS OF VIDEO CONTENT

BACKGROUND

The present invention relates generally to video editing and, more particularly, to dynamically providing customized versions of video content.

There exist different methods of rating and editing audio and video content for distribution to different audiences. Current rating methods include a manual process for producing fixed versions of content at different rating levels. There are also known solutions for assigning content ratings to segments of a work based on the content contained in the respective segments, wherein content is determined based on audio and video analysis of the segments.

A recurrent neural network (RNN) is a class of artificial neural network where connections between notes form a direct graph along a sequence. In RNNs, a chunk of neural network looks at some input and outputs a value. A loop allows information to be passed from one step of the network to the next. A long short-term memory (LTSM) network is a kind of RNN capable of learning long-term dependencies.

SUMMARY

In an aspect of the invention, a computer-implemented method includes: analyzing, by a computing device, a video to determine content of portions of the video and context of the portions of the video; assigning, by the computing device, one or more content editing categories to the portions of the video based on the analyzing; determining, by the computing device, an unwanted scene of the video based on the one or more content editing categories and user profile data of a viewer; determining, by the computing device, a style component of the unwanted scene based on context of the unwanted scene and the user profile data; generating, by the computing device, custom content to replace the unwanted scene of the video based on an acceptable portion of content corresponding to the unwanted scene and the style component; editing, by the computing device, the video to replace the unwanted scene of the video with the custom content to produce an edited video including the custom content; and providing, by the computing device, the edited video to the viewer.

In another aspect of the invention, there is a computer program product including a computer readable storage medium having program instructions embodied therewith. The program instructions are executable by a computing device to cause the computing device to: feed quantitative user feedback data of a viewer of a video to a convolutional neural network of the computing device to produce a user feedback vector; feed qualitative user feedback data of the viewer to an encoder to produce word encodings; feed the word encodings and the user feedback vector into a series of long-short term memory networks to produce a user experience vector; feed the user experience vector to a second convolutional neural network; utilizing an output from the second convolutional neural network, determine an objectionable portion of the video with respect to the viewer; determine a style component of the objectionable portion of the video; generate custom content to replace the objectionable portion of the video based on an acceptable portion of content corresponding to the objectionable portion of the video and the style component; and edit the video to replace the objectionable portion of the video with the custom content to produce an edited video including the custom content.

In another aspect of the invention, there is a system including a processor, a computer readable memory and a computer readable storage medium associated with a computing device; program instructions to provide a video to a viewer; program instructions to determine an unwanted portion of the video, as the video is being provided to the viewer, based on one or more content editing categories assigned to portions of the video and user data of the viewer; program instructions to determine a style component of the unwanted portion of the video based on context of the unwanted portion of the video and the user data; program instructions to generate custom content to replace the unwanted portion of the video based on an acceptable portion of content corresponding to the unwanted portion of the video and the style component; and program instructions to provide the custom content to the viewer in real-time, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
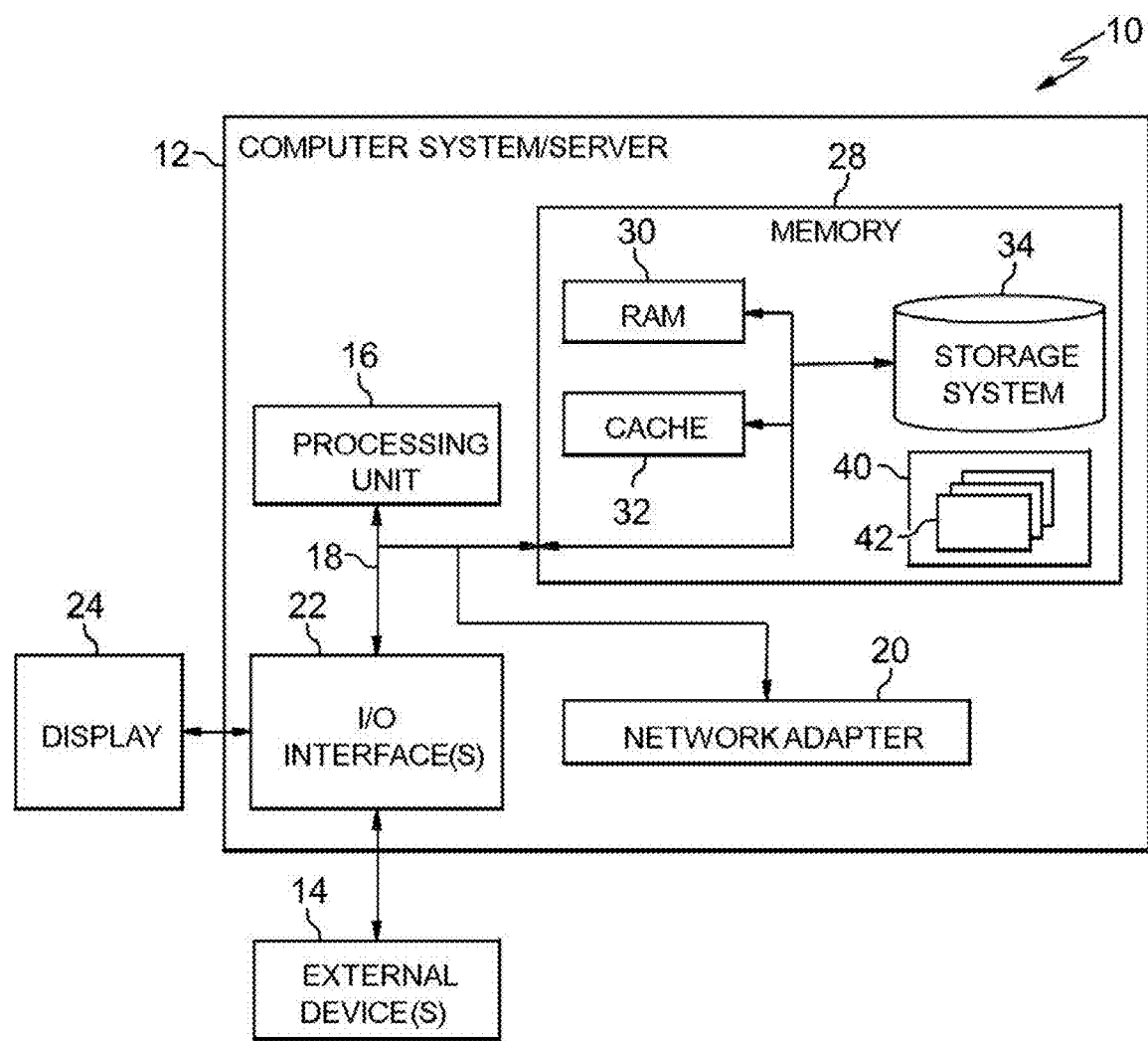
FIG. 1 depicts a computing infrastructure according to an embodiment of the present invention.

The present invention relates generally to video editing, and more specifically to dynamically providing customized versions of video content. In embodiments, a system and method is provided for presenting an edited version of video content in real-time based on user configured settings, stored knowledge about the content, and generated replacement content.

Distribution channels for audio and video content used to be controlled, but as the proliferation of digital distribution channels has grown, more and more unedited content is freely available to audiences. With so much video content easily available to users, it is often difficult to know what objectionable or unwanted material is contained in the content, and what is offensive for a particular person, or groups of people. Users may wish to view different versions of content at different times or with different audiences, with or without potentially risqué or offensive elements. For example, parents continue to look for ways to monitor and control what their children may see and hear at given ages, and may want to watch one version of a video with their children, but a different version without their children. Current solutions include a manual process for producing fixed versions of content at different rating levels. There are also solutions for analyzing sound for words and for identifying visual elements in video, and for manually editing content based on known points of a content index.

Advantageously, embodiments of the present invention dynamically change video scenes, wherein the scenes may be changed between each video viewing based on user reactions, biometrics, group dynamics, parental controls, and social media. Aspects of the invention streamline the process and time required to produce multiple versions of video content for different distribution targets. Some users may wish to view existing content, but at different rating levels. In embodiments, the present invention provides a system enabling users to configure profiles defining acceptable words, intent of phrases, and visuals for viewing. Aspects of the system present a dynamically edited content series based on a single provided image and correlated image styles with user interpretations. In embodiments, a system learns both content and styles that users like, depending on each user interpretation. In aspects, the system learns within a group setting by discovering average word and user reaction embedding. Thus, embodiments of the invention provide improvements in that technical field of video editing by providing technical solutions to the problem of distributing appropriate/customized digital audio and video content to users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
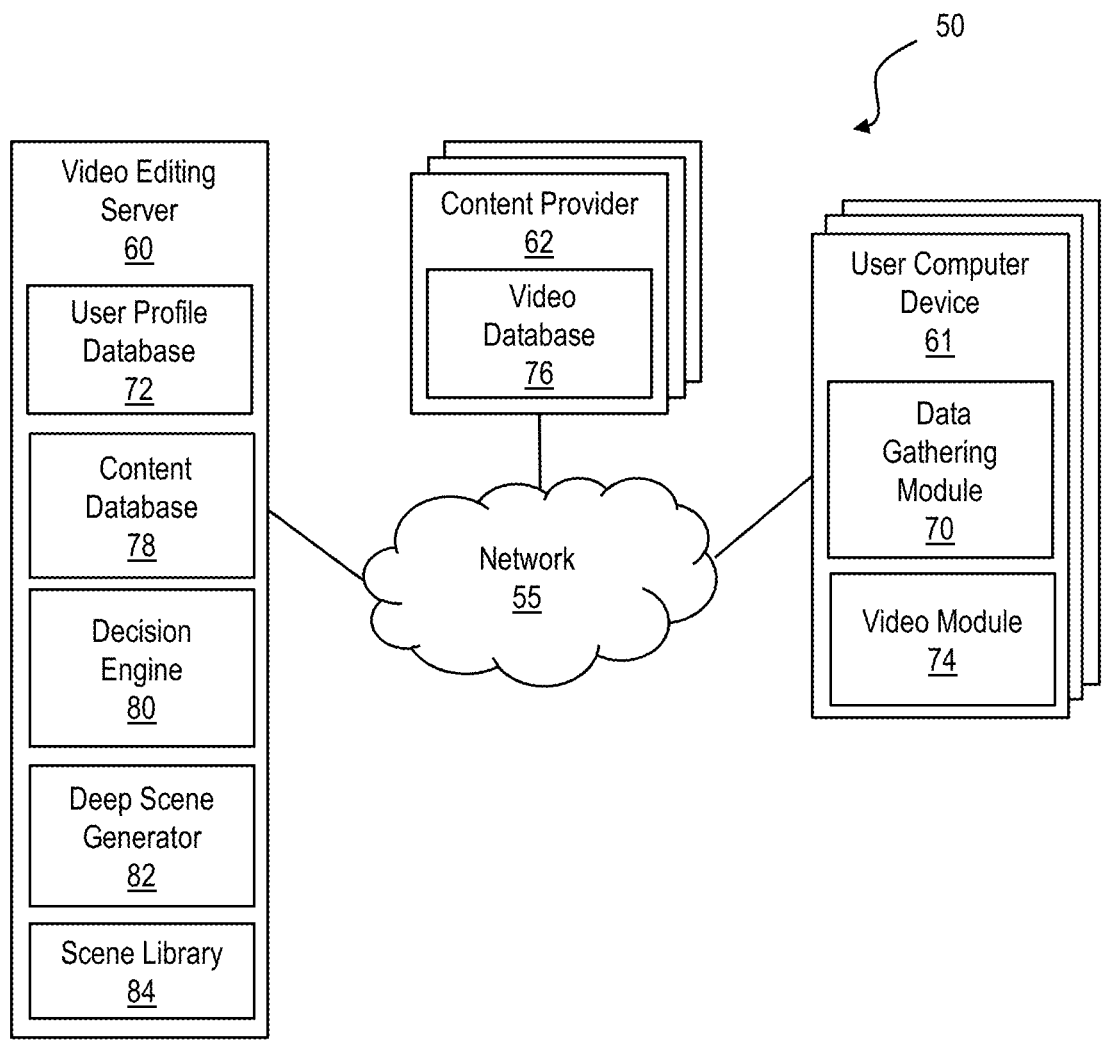
FIG. 2 shows an exemplary environment in accordance with aspects of the invention.

FIG. 2 shows an exemplary video distribution environment 50 in accordance with aspects of the invention. The video distribution environment 50 includes a network 55 connecting a video editing server 60 with one or more user computer devices 61 and one or more content providers 62. The video editing server 60 may comprise the computer system 12 of FIG. 1, and may be connected to the network 55 via the network adapter 20 of FIG. 1. The video editing server 60 may be configured as a special purpose computing device that is part of a digital content distribution infrastructure. For example, the video editing server 60 may be configured to receive digital audio and video content from one or more content providers 62, and provide dynamically edited versions of the audio and video content to one or more user computer devices 61 in real-time or near-real time based on output from neural networks of the video editing server 60.

The network 55 may be any suitable communication network or combination of networks, such as a local area network (LAN), a general wide area network (WAN), and/or a public network (e.g., the Internet). Each user computer device 61 includes one or more components of the computing device 12, and may be any electronic device or combination of electronic devices configured to provide audio/video content to a user, such as a set-top box provided by an internet and/or cable provider in communication with a television, or a personal computing device (e.g., laptop computer, desktop computer, smartphone, tablet computer, etc.).

In embodiments, the user computer device 61 includes one or more program modules executed by the user computer device 61 (e.g., program module 42 of FIG. 1), which are configured to perform one or more of the functions described herein. In embodiments, the user computer device 61 includes a data gathering module 70 configured to obtain user profile data from a user or other source, and communicate the user profile data to the video editing server 60 for storage in a user profile database 72. In aspects, the user computer device 61 includes a video module 74 for receiving audio/video content from the video editing server 60 and displaying the audio/video content to a user (e.g., via a display 24 of FIG. 1). In aspects, the video module 74 is configured to receive streaming digital content from the video editing server 60 to display to the user in real-time or near-real time.

Still referring to FIG. 2, in embodiments, the video editing server 60 includes one or more program modules executed by the video editing server 60 (e.g., program module 42 of FIG. 1), which are configured to perform one or more of the functions described herein. In aspects, the video editing server 60 receives original or unedited audio/video content from a video database 76 of one or more content providers 62 for storage in a content database 78 of the video editing server 60.

In embodiments, a decision engine (decision module) 80 of the video editing server 60 is configured to: analyze user data to determine user preferences and generates content editing categories based on the user preferences; analyze audio/video content to determine matches between content and predetermined content editing categories (e.g., categories of objectionable or unwanted content); determine matches between video content and user defined content of interest; determine context of video content; analyze user feedback data (e.g., video rewinding data and biometric data); and generate user experience vectors utilizing a combination of convolutional neural networks and long short-term memory neural networks.

In embodiments, the decision engine 80 is also configured to receive a user request for content; and determine audio/video content based on the request. In aspects, the decision engine 80 is in communication with a deep scene generator (deep scene module) 82 configured to determine an objectionable (unwanted) portion of the audio/video content; determine an acceptable replacement portion of content; determine a style component based on context of the objectionable portion; generate custom replacement content; splice the custom content into the audio/video content to produce customized audio/video content; and provide the customized audio/video content to the decision engine 80 for distribution to the user computer device 61 and display to the user (e.g., via the video module 74). In embodiments, a scene library 84 of the video editing server 60 saves content for use in the customization of the audio/video content by the deep scene generator 82.

In embodiments, the video distribution environment 50 may include additional or fewer components than those shown in FIG. 2. In embodiments, separate components may be integrated into a single computing component or module. Additionally, or alternatively, a single component may be implemented as multiple computing components or modules.

Figure 3A:
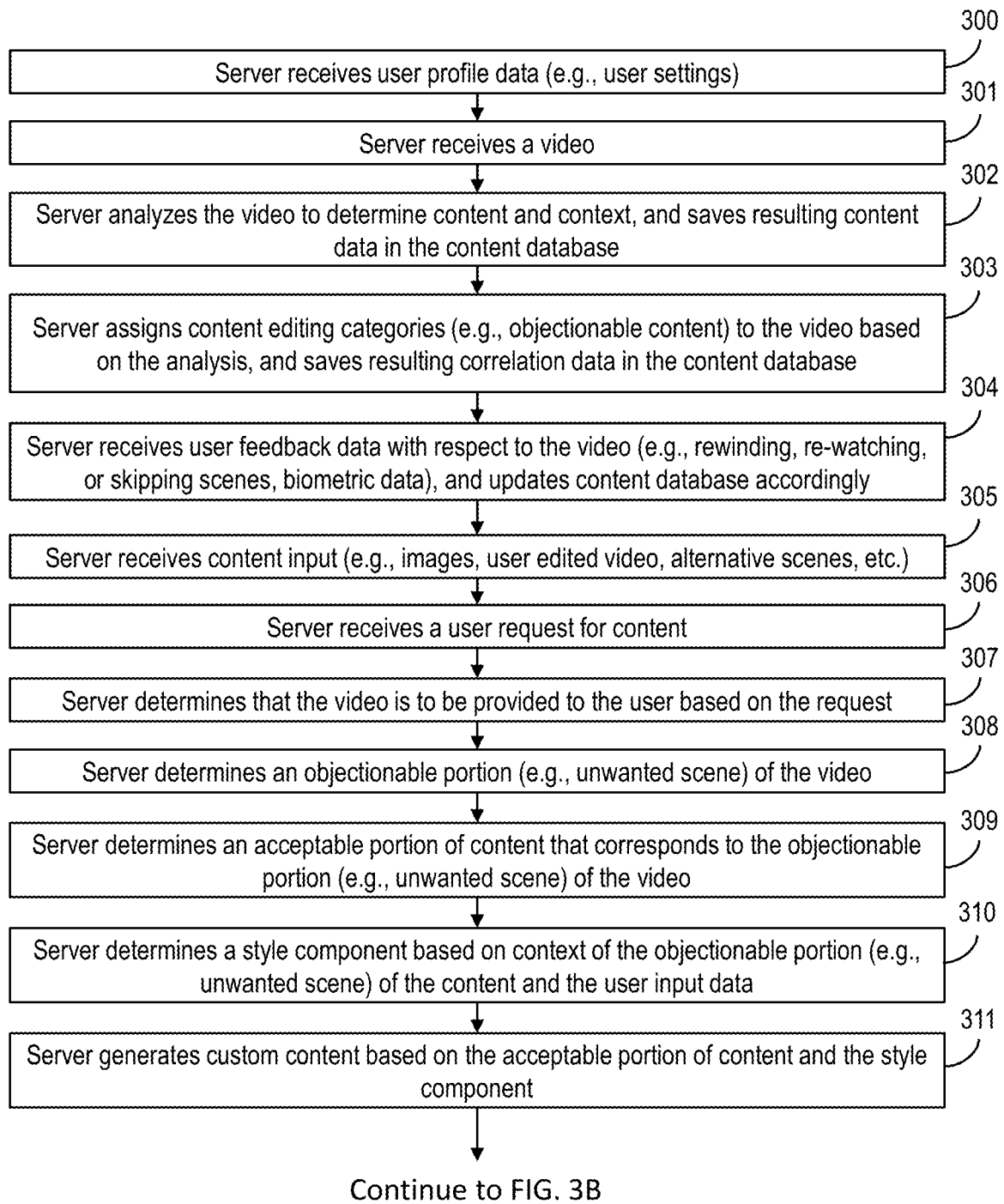
FIGS. 3A and 3B shows a flowchart of steps of a method in accordance with aspects of the invention.
Figure 3B:
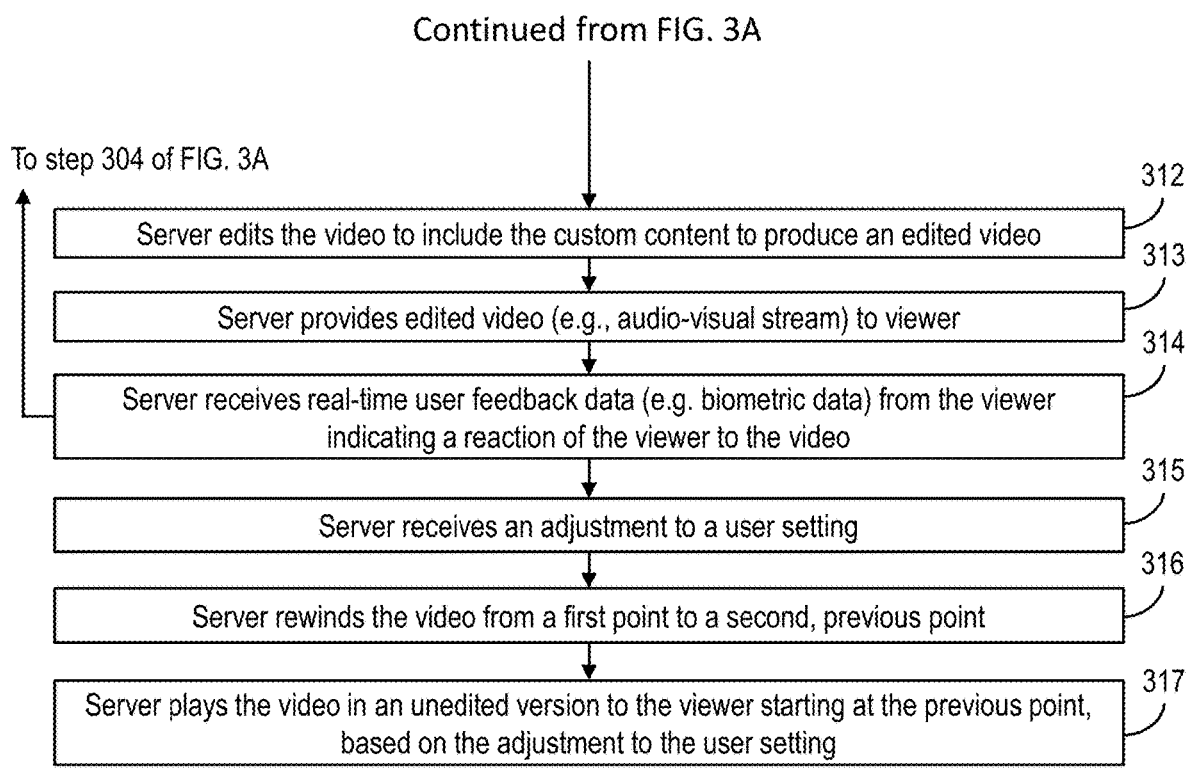

FIGS. 3A-3B shows a flowchart of a custom content generating method in accordance with aspects of the invention. Steps of the method of FIGS. 3A-3B may be performed in the environment illustrated in FIG. 2, and are described with reference to elements shown in FIG. 2.

At step 300 of FIG. 3A, the video editing server 60 receives user profile data, and saves the data in the user profile database 72 of the video editing server 60. In aspects, user profile data includes a user selection of objectionable (unwanted) words, phrases, intent or context, visuals, or combinations thereof; and/or a user selection of acceptable words, phrases, intent or context, visuals or combinations thereof. In embodiments, the video editing server 60 provides selectable options to a user via the data gathering module 70 of the user computer device 61. In aspects, the decision engine 80 of the video editing server 60 analyzes the user profile data to determine editing categories for objectionable content to be edited for a particular user, and saves the editing categories in the user profile database 72. Editing categories may include, for example, context categories such as scary or frightening, or may be directed to particular content such as an actor.

At step 301, the video editing server 60 receives a video content (e.g., a new piece of audio/visual content) to be distributed to one or more user computer devices 61 from one or more content providers 62. In embodiments, the video editing server 60 receives the video content (hereafter video) from a content provider 62 and saves the video as original or unedited content in the content database 78. In aspects, the video editing server 60 receives a streaming video from a content provider 62 and edits the streaming video in real-time during distribution to one or more user computer devices 61 in accordance with step 313 discussed below. In embodiments, the video editing server 60 is part of a system which generates original video content.

At step 302, the video editing server 60 analyzes the video received at step 301 to determine content and context of portions of the video and/or context of the video as a whole. In aspects, the video editing server 60 analyzes the video for audio and visual cues which match a known set of items which fall into categories of content subject to editing (content editing categories). Various content and context analysis tools and methods may be utilized by the video editing server 60 in the performance of step 302, including image recognition techniques, speech to text techniques, natural language processing (NLP) tools, and text recognition tools. In aspects, the decision engine 80 of the video editing server 60 implements step 302.

In embodiments, the decision engine 80 utilizes metadata associated with the video to determine context of one or more portions of the video, and/or the video as a whole. For example, by analyzing data regarding the video's creators, previous works of the creators, the genre of the video, and related video content products, the decision engine 80 can add context to its content analysis. This context can lead to a better understanding of identified audio and visual cues, helping the video editing server 60 understand innuendo, gratuitous content, or meaningful content.

At step 303, the video editing server 60 assigns content editing categories (e.g., objectionable content categories) to one or more portions of the video received at step 301, and generates correlation data based thereon. In aspects, the decision engine 80 of the video editing server 60 implements step 303, and tags or otherwise associates the one or more portions of the video with one or more of the predetermined content editing categories. In aspects, the video editing server 60 saves the correlation data in the content database 78. For example, the video editing server 60 may determine that a scene in a digital video contains fighting between humans, and that the fighting is in the context of a scene involving angry emotions. In this example, the video editing server 60 associates the fight scene with an appropriate predetermined content editing category using, for example, time stamps of the video.

At step 304, the video editing server 60 optionally receives user feedback data with respect to the video received at step 301. User feedback data may be in the form of video watching data (users' rewinding scenes, skipping scenes, re-watching scenes, muting scenes, etc.), biometric data, user survey data, observed user behavior data, direct input from users, or other user feedback data. In one example, the video editing server 60 receives direct input from a user that a portion of the video contains objectionable content in the form of violence. In embodiments, the video editing server 60 receives video watching data from the data gathering modules 70 of one or more user computer devices 61. In this way, embodiments of the invention enable the video editing server 60 to gather crowd-sourced data regarding viewing patterns associated with the video, which the decision engine 80 utilizes to determine content and/or context of portions of the video. In embodiments, the user feedback data is in the form of biometric data of the user, such as biometric data from a wearable device of the user. In aspects, the user feedback data is in the form of observed behavioral data, such as from authorized image data taken of the user when viewing the video. In embodiments, the video editing server 60 updates correlation data for the video based on the user feedback data. The decision engine 80 may implement update correlation data in the content database 78 in accordance with step 304.

In one example, multiple users authorize (via user profile data of step 300) the video editing server 60 to access biometric data (e.g., wearable device data) associated with video watching sessions of the users. In this example, the video editing server 60 receives data indicating a portion of the video at which the users' heart rates tend to accelerated dramatically, indicating a frightening event in the video. In accordance with this example, the video editing server 60 may update correlation data associated with this frightening portion of the video to indicate a frightening event (e.g., a predetermined content editing category of "scary").

In embodiments, at step 304, the video editing server 60 matches content of the video against social or online content review systems. Information from the social or online content review systems can improve the learning and recognition of the video editing server 60 by cross-referencing human feedback and identification of scenes which may contain objectionable content with the automated analysis of steps 302 and 303.

Based on the above, it can be understood that, in embodiments, the video editing server 60 learns about the video received at step 301 through consumer inputs and machine side inputs (e.g., analysis of the decision engine 80). From the consumer side, the video editing server 60 receives information through user settings, user interactions with the video or similar videos, direct feedback regarding the video and/or biometric feedback. From the machine side, the video editing server 60 analyses the content of the video, including metadata such as the creators of the content, and feedback analysis through direct means or social channel consumption. In embodiments, the video editing server 60 learns geographical and cultural sensitivities to content based on the analysis of user feedback data for multiple users. In aspects, the decision engine 80 implements step 304.

At step 305, the video editing server 60 receives content input to be utilized in the content editing process of FIG. 3B, and saves the content in the scene library 84. The video editing server 60 may receive content input from one or more user computer devices 61, content providers 62, or other sources. Content input may be in the form of images, user edited video segments, one or more alternative scenes for a video, or the like. Content input may be previously generated custom content in accordance with FIG. 3B, discussed below.

At step 306, the video editing server 60 receives a user request for content from a user (hereafter viewer). The request may be in the form of a video selection received at the video editing server 60 via a network communication from a set top box (e.g., the user computer device 61) of a viewer, a search query related to a video, a type of video, a category of video (e.g., rating, genre, etc.) or other data related to the identification of a video. Optionally, a viewer informs the video editing server 60 of what content rating they wish to view, or makes individual setting selections regarding more specific content, such as choosing words, or visuals which are acceptable or unacceptable.

At step 307, the video editing server 60 determines a video to be provided to the viewer based on the user request. In one example, the video editing server 60 receives a request for an action movie, sends a list of possible matches to the viewer, and receives a user selection of one of the possible matches from the viewer in accordance with step 306. In this example, the video editing server 60 determines that the video to be provided to the viewer is the video indicated in the user selection. Other methods of determining a video based on a user request may be utilized in accordance with step 307. In aspects, the decision engine 80 implements step 307.

At step 308, the video editing server 60 determines an objectionable or unwanted portion of the video (e.g., an unwanted scene from the video determined at step 307). It should be understood that the video editing server 60 may determine multiple objectionable portions of the video, however, for the sake of simplicity, only one objectionable portion of the video will be discussed with respect to the method steps of FIGS. 3A-3B. In embodiments, the video editing server 60 determines the objectionable portion of the video by matching objectionable content in the user profile data of the viewer with the predetermined content editing categories of step 303 of FIG. 3A. For example, a viewer's user profile may indicate that the viewer objects to watching violent fight scenes. In this example, the video editing server 60 determines that a fight scene in the video is an objectionable portion of the video based on the user's profile matching fight scene correlation data for the objectionable portion of the video in the content database 78. In another example, the video editing server 60 determines from user profile data in the user profile database 72 that the viewer has historically shown signs of distress (e.g., via biometric data or other user feedback data) when similar content has been presented to them in the past, and determines (based on a match between the content and context of the prior objectionable content and current content being viewed) that the current content is objectionable content. In another example, the unwanted real-time portion of content is sound that is too muffled to be heard properly (e.g., does not meet a threshold volume or threshold clarity parameter). Various methods for determining objectionable content based on matches between user profile data in the user profile database 72 and content and context data in the content database 78 may be utilized by the decision engine 80 of the video editing server 60 in determining an objectionable portion of the video in accordance with step 308.

At step 309, the video editing server 60 determines an acceptable portion of content that corresponds to the objectionable portion of content. In aspects, the acceptable portion of content is in the form of a group of replacement images and/or audio (e.g., a group of images making up a scene). In embodiments, the deep scene generator 82 of the video editing server 60 selects an acceptable piece of content that corresponds to the start of an offensive scene determined at step 308. In aspects, the video editing server 60 may determine an acceptable portion of content based on content previously determined to be an acceptable substitution for a particular portion of a video. For example, an acceptable portion of content in a scene library 84 may be saved with an association to a fight scene in a video, wherein the acceptable portion of content was predetermined by the video editing server 60 or an outside party, to be an acceptable substitute for the fight scene (i.e., the objectionable portion of the video). In another example, the replacement portion of content (acceptable portion of content) is a pre-recorded version of the sound that is clearer.

In embodiments, the video editing server 60 determines the acceptable portion of content (e.g., appropriate replacement scene) based on scene length of the objectionable portion, scene length of the acceptable portion, visual and audio context of the objectionable portion and visual and/or audio context of the acceptable portion. For example, in one embodiment, the deep scene generator 82 matches the scene length, content and context of the objectionable portion determined at step 309 with potential acceptable portions in the scene library 84 to determine one or more acceptable portions of content that can be utilized by the video editing server 60 to replace the objectionable portion.

At step 310, the video editing server 60 determines a style component for the acceptable portion of content based on context of the objectionable portion and the user input data from the viewer's user profile. In aspects, the deep scene generator 82 of the video editing server 60 dynamically selects the style component based on the objective of the objectionable portion of video (e.g., based on context data associated with the portion of video) and the user's response. For example, if the objective of the scene is to induce fear and the viewer is generally subdued, a darker style will be chosen by the video editing server 60. In aspects, the video editing server 60 learns through backpropagation whether the style determined at step 310 does or does not anneal the group of replacement images towards the objective of the objectionable portion of the video. Backpropagation as used herein refers to a method used in artificial neural networks to train deep neural networks. In one deep neural network example, a label is the current user reaction (e.g., real-time biometric data of the viewer) and a training example is a previous style. As a result, in embodiments, the video editing server 60 adjusts to the audience (viewer) in real time with different generated art sequences for insertion (as a replacement for objectionable content).

At step 311, the video editing server 60 generates custom content based on the acceptable portion of content determined at step 309 and the style component determined at step 310. In aspects, the custom content is generated using real-time user experience vectors, discussed below with respect to FIG. 3C. In aspects, the custom content comprises sequential movie or video art. In one example, custom content is generated in the form of an obscured fight scene based on a fight scene of a movie determined to be objectionable at step 308. In this example, the style of the obscured fight scene matches the determined style of the actual fight scene. Thus, in embodiments, the video editing server 60 generates substitute content that matches the style of the original objectionable content. In aspects, a library of motion tracked framework scenes (e.g., from the scene library 84) is used by the video editing server 60 to create new scenes based on characters and objects extracted from the source video (the unedited video). In aspects, the deep scene generator 82 of the video editing server 60 implements step 311.

Continuing at FIG. 3B, at step 312, the video editing server 60 incorporates the custom content of step 311 into the video to produce an edited or customized video. Various video creation methods may be utilized by the video editing server 60 in the performance of step 312. In embodiments, the video editing server 60 splices the custom content into the video, inserts and removes images of the video, and animates objects between points of insertion and removal of images. In embodiments, the video editing server 60 finds an appropriate replacement scene based on scene length, and visual and audio context; and then remixes appropriate audio onto the new visual in order to convey the original meaning of the video content. Thus, in embodiments, the video editing server 60 creates edited videos with customized replacement image and/or audio content. In aspects, the deep scene generator 82 implements step 312. Based on the above, it can be understood that embodiments of the invention enable the generation of unique video art for splicing into an original film. As a result, embodiments of the invention enable the creation of multiple edited variations of video content, which are each specifically tuned and changed in real-time for an audience.

At step 313, the video editing server 60 provides the edited video content (e.g., edited audio-visual stream) of step 312 to the viewer. In aspects, the video editing server 60 provides the edited content from step 312 to a user computer device 61 (via the network 55) for viewing by the viewer in real-time or near-real time as the video editing server 60 is creating the edited video content. In aspects, the decision engine 80 implements step 313. Although not depicted, the video editing server 60 may also provide a notification to an interested party associated with the video indicating that the video has been edited. In aspects, the notification includes details regarding editing performed on a video by the video editing server 60. For example, the video editing server 60 may send a notification to a director of a video stream notifying the directed of the censoring action so that action can be taken to correct any issues in the video going forward (e.g. by fixing a microphone that made a muffled sound in the audiovisual stream).

At step 314, the video editing server 60 optionally receives real-time user feedback from the viewer as the viewer consumers the video. In aspects, the real-time user feedback data indicates a reaction of the viewer to the video they are consuming (either an unedited portion or an edited portion). For example, the video editing server 60 may receive video watching data (e.g., rewinding data, fast forward data, etc.) in accordance with step 304 of FIG. 3A. Viewer actions such as rewinding and re-watching scenes or skipping scenes can both give the video editing server 60 clues and help it learn about scenes which should be analyzed further. Optionally, the video editing server 60 may receive biometric feedback from a viewer. Heart rate, body temperature, pupal dilation and body position are examples of biometric feedback that can be monitored (by user computer devices not shown) and used by the video editing server 60 to identify particular scenes which may be subject to editing. A variety of biometric data may be collected by the video editing server 60 in accordance with step 314, and the present invention is not intended to be limited to the examples discussed herein.

It should be understood that steps of FIGS. 3A-3B need not be performed consecutively unless a consecutive order is specifically discussed herein.

Figure 3C:
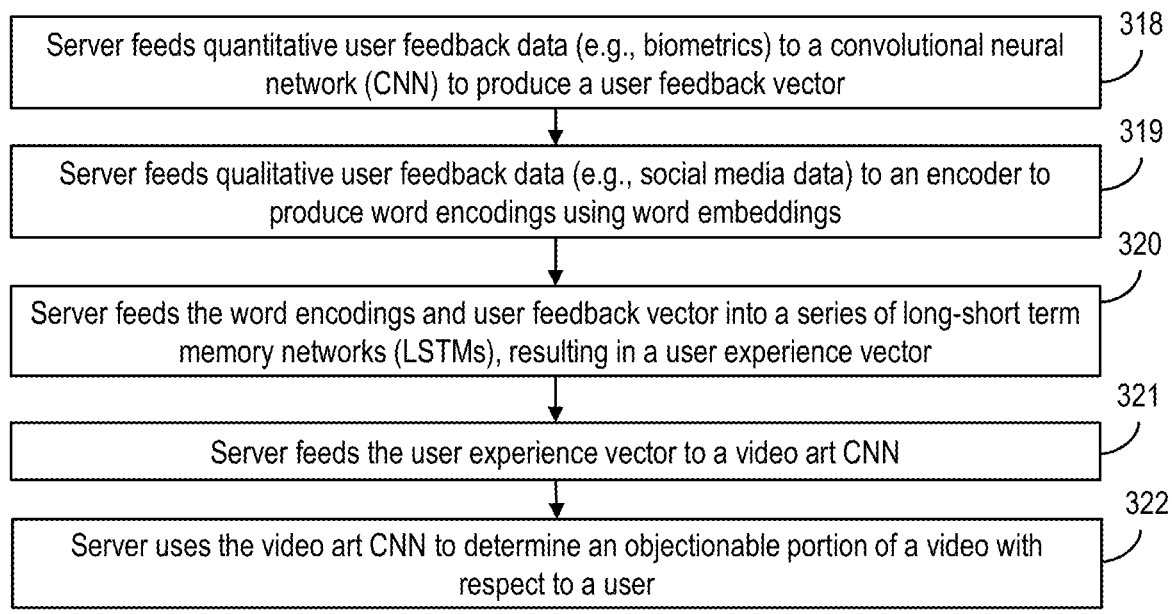
FIG. 3C shows a flowchart of neural network methods utilized in accordance with aspects of the invention.

FIG. 3C shows a flowchart of neural network methods utilized in accordance with aspects of the invention. Steps of the method of FIG. 3C may be performed in the environment illustrated in FIG. 2, and are described with reference to elements shown in FIG. 2 and method steps of FIGS. 3A-3B.

In embodiments of the invention the video editing server 60 utilizes convolutional neural network (CNN) and long-short term memory (LSTM) neural network structures to implement steps of the invention. In aspects, the video editing server 60 trains an artificial neural network using training response vectors derived from real-time user feedback data. More specifically, as set forth in step 318 of FIG. 3C, in embodiments, the video editing server 60 feeds quantitative user feedback data (e.g., biometric data) into a convolutional neural network (CNN) of the decision engine 80, to produce a user feedback vector. The term vector as used herein refers to a learning vector for input into an artificial neural network.

At step 319, the video editing server 60 feeds qualitative user feedback data (e.g., social media data indicating preferences of a viewer) to an encoder to produce word encodings (e.g., text mapped to vectors or real numbers) using word embeddings. A word embedding as used herein refers to a collective name for a set of language modeling and feature learning techniques in natural language processing (NLP) where words or phrases are mapped to vectors or real numbers.

At step 320 of FIG. 3C, the video editing server 60 feeds the word encodings of step 319 and the user feedback vector of step 318 into a series of long-short term memory (LSTM) neural networks, resulting in a user experience vector output.

At step 321, the video editing server 60 feeds the user experience vector of step 320 to a video art CNN (second CNN). In aspects, the user experience vector is fed to the video art CNN dynamically based on the processing of real-time user feedback data received in accordance with step 314 of FIG. 3B.

At step 322, the video editing server 60 utilizes an output of the video art CNN of step 321 to determine the objectionable portion of the video (with respect to the viewer), in accordance with step 308 of FIG. 3A. In embodiments, the decision engine 80 and/or the deep scene generator 82 perform one or more of steps 319-322.

In embodiments, the deep scene generator 82 of the video editing server 60 uses a stack of long short-term memories (LSTMs) to remember the previous weights for each previous scene (group of images). The words and natural language derived from the previous scene are projected into a word embedding function of the video editing server 60, and then pushed through an encoder of the video editing server 60. In aspects, biometric data samples are sent through convolutional neural networks (CNNs), where the last hidden layer activation layers are exported into an encoder. Each of the encoded elements are concatenated and input into a series of LSTMs. The output of the LSTM results in the user experience vector, which is then added into a video art CNN of the deep scene generator 82, along with style and content. The style is always streaming from a learned style bank (e.g., scene library 84) while the user experience vector is generated in real time by the video editing server 60.

Figure 4:
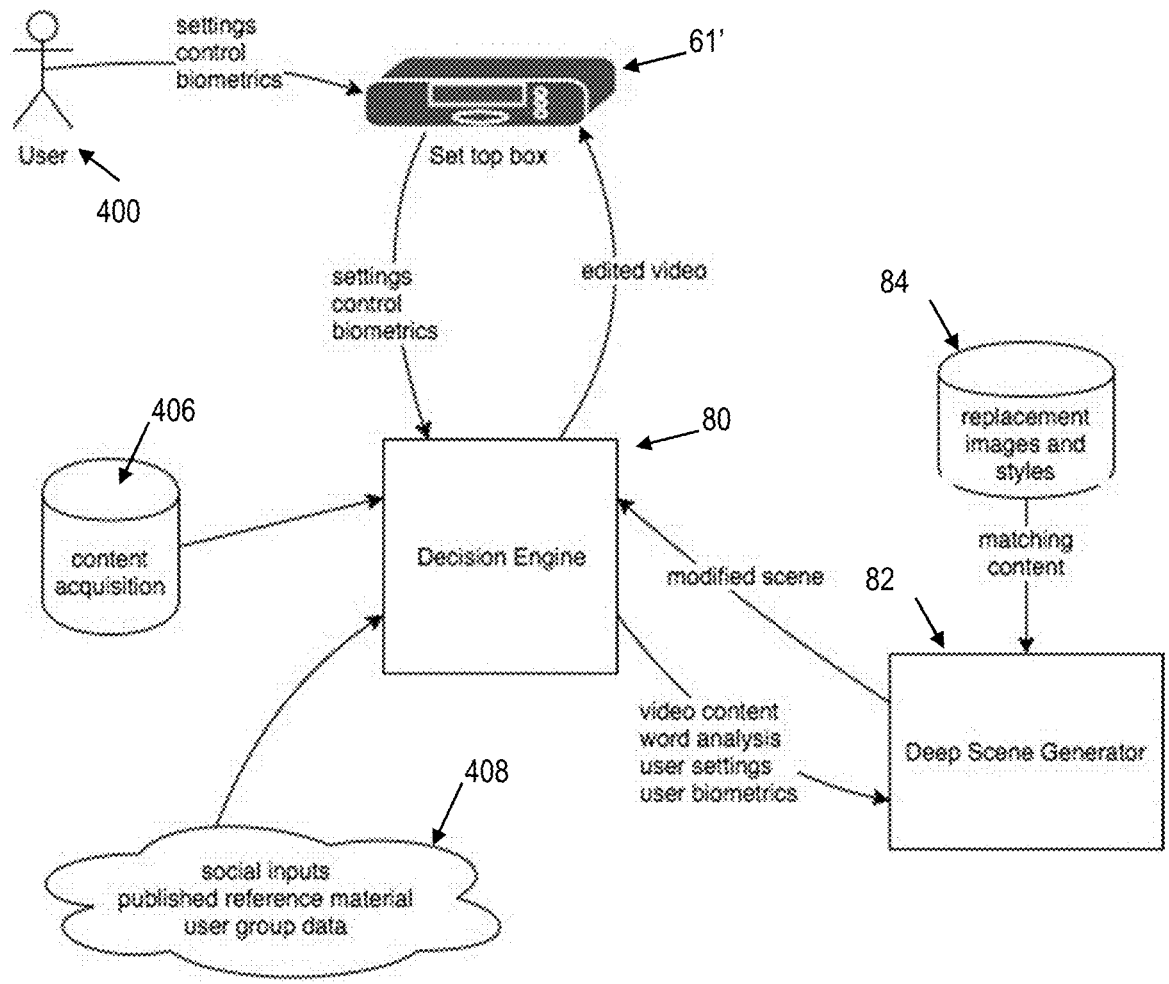
FIG. 4. depicts an exemplary use scenario in accordance with embodiments of the invention.

FIG. 4 depicts an exemplary use scenario in accordance with embodiments of the invention. The scenario of FIG. 4 may be performed in the environment illustrated in FIG. 2, utilizing elements shown in FIG. 2 and method steps outlined in FIGS. 3A-3C.

As depicted in FIG. 4, a viewer of content (hereafter viewer) represented at 400 provides user inputs (e.g., user defined settings and control data, and biometrics data) to a set top box 61' (e.g., a user computer device 61 of FIG. 2). The set top box 61' provides the user inputs to the decision engine 80, and the decision engine 80 of the video editing server 60 (shown in FIG. 2) receives the inputs in accordance with steps 300 and 304 of FIG. 3A and step 314 of FIG. 3B. The decision engine 80 acquires content (e.g., digital video content) from one or more content sources 406 (e.g., content provider 62 of FIG. 2), as well as user feedback data (e.g., social inputs, published reference material, user group data) from one or more internal or external sources represented at 408. In accordance with step 303 of FIG. 3, the decision engine 80 analyzes the acquired content to determine content and context, and feeds data (e.g., video content data, word analysis data, user setting data, user biometrics data) to the deep scene generator 82. The deep scene generator 82 obtains replacement image data and style data from the scene library 84, and generates a modified scene (customized content) in accordance with step 311 of FIG. 3A, wherein the modified scene is intended to replace an unwanted or objectionable scene determined by the decision engine 80. In accordance with the exemplary scenario of FIG. 4, the decision engine 80 then integrates the modified scene into the acquired content in place of the unwanted or objectionable content, and provides the edited acquired content (e.g., edited video) to the set top box 61' for presentation to the viewer 400.

Figure 5:
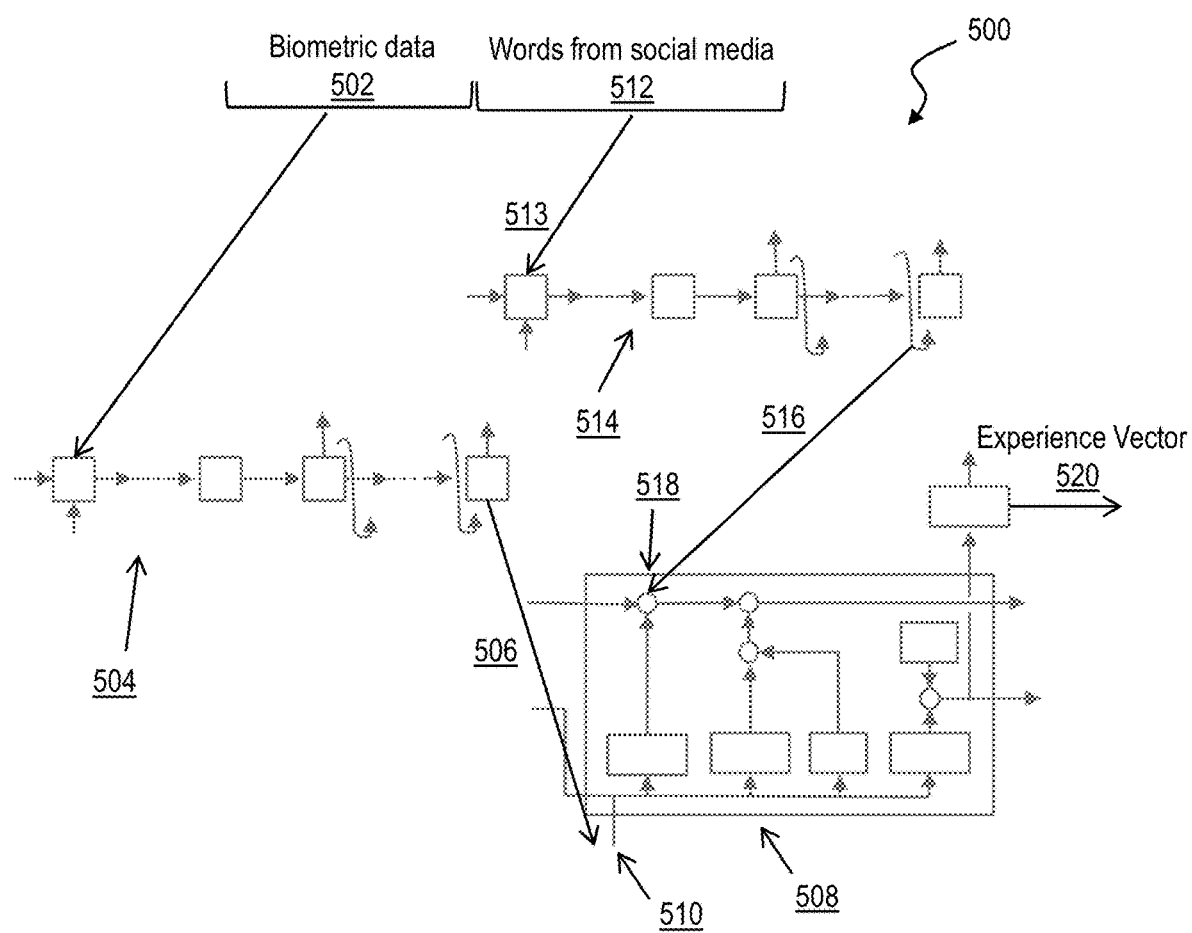
FIG. 5 illustrates a CNN LSTM neural network model utilized according to embodiments of the present invention to produce an experience vector.

FIG. 5 illustrates a CNN LSTM neural network model 500 utilized according to embodiments of the present invention to produce an experience vector, utilizing the steps of FIG. 3C. As illustrated, quantitative user feedback data in the form of biometric data 502 is fed through a CNN represented at 504. The output 506 of the CNN 504 is input to an LSTM 508 at input 510. Additionally, qualitative user feedback data in the form of words from social media networks 512 is converted into word embeddings represented at arrow 513, and the word embeddings 513 are input to an encoder represented at 514. In general, word embeddings 513 are numeric representations of text. The encoder 514 generates word encodings represented at arrow 516 used at a pointwise operation 518 of the LSTM 508. The LSTM 508 outputs an experience vector 520 in accordance with step 320 of FIG. 3C.

Figure 6:
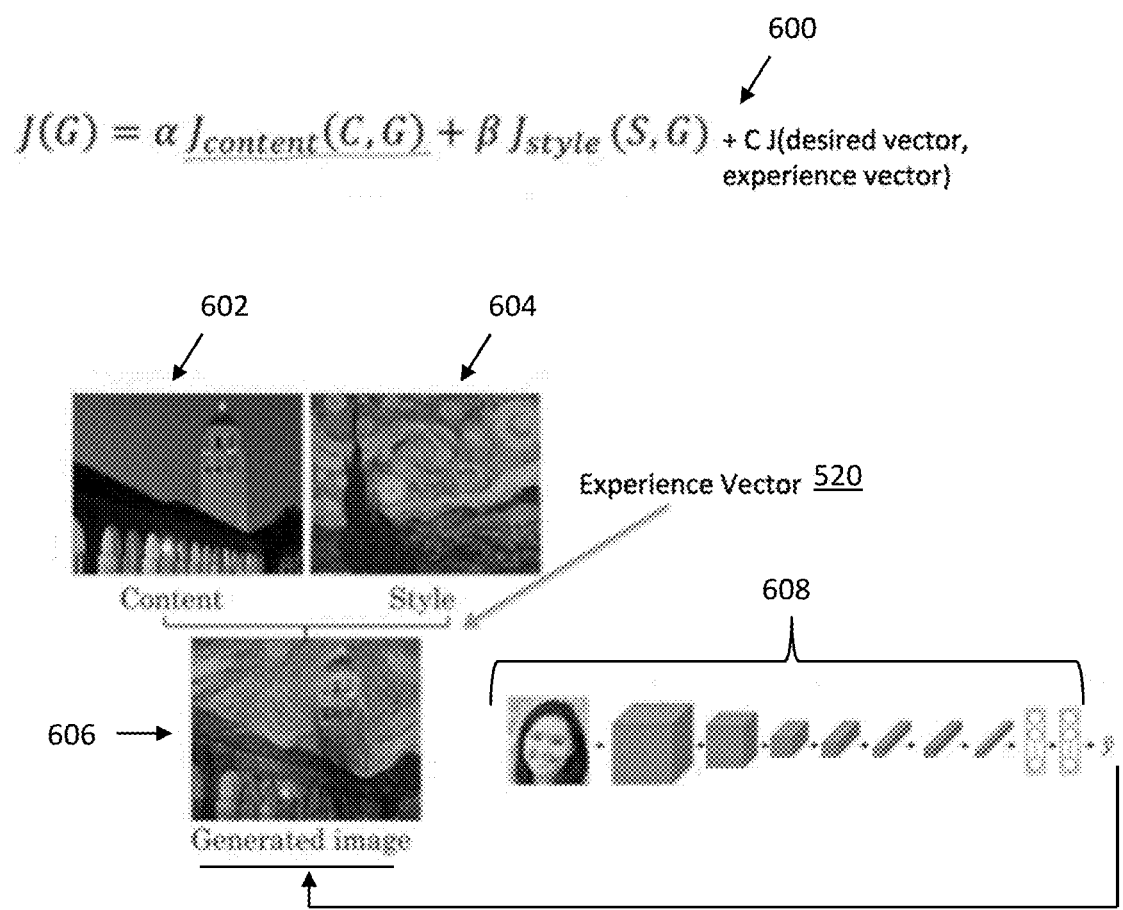
FIG. 6 illustrates an exemplary image sequence, wherein an algorithm represents the combination of content and style.

FIG. 6 illustrates an exemplary image sequence, wherein an algorithm 600 represents the combination of content and style. The following algorithm depicted in FIG. 6 may be utilized to determine a merged image J(G):

$$J(G)=\alpha J_{content}(C,G)+\beta J_{style}(S,G)+CJ(\text{desired vector, experience vector})$$

In the algorithm 600, $\alpha J_{content}$=a content image, $\beta J_{style}$=a style image, C=content, S=style and G=merged. CJ(desired vector, experience vector) represents a "cost function". In aspects, the algorithm 600 will not get things right the first time. That is, the video editing server 60 may produce a video or splice (as the custom content of step 311 of FIG. 3A) that is not helpful to the viewer, or that needs editing. When user feedback is provided, the algorithm will compute the difference between the "desired vector" (the feedback given by the user) and the "experience vector" (what the video editing server 60 knows about the user). The video editing server 60 will then update what it knows about the user in the user profile database 72. One example would be a system that has 30% confidence that a user likes "cooking shows". If the video editing server 60 in this example decides to edit out a cooking segment from a set of videos, and the user later indicates they wanted to see the cooking segment, the system may incorporate that feedback and increase the internal confidence about the user preference for cooking shows (e.g., to a 50% confidence level). The exact adjustments to confidence are rarely known, and this example is offered only as a simple example of a cost function in accordance with embodiments of the invention.

As depicted in FIG. 6, in embodiments, the video editing server 60 determines an acceptable portion of content 602 that corresponds to an objectionable portion of content, in accordance with step 309 of FIG. 3. In accordance with step 310 of FIG. 3, the video editing server 60 also determines a style component 604. The video editing server 60 generates custom content 606 (e.g., a generated image) based on the acceptable portion of content 602 and the style component 604, using the experience vector 520 of FIG. 5. The block diagram represented at 608 represents a logical neural network architecture. More specifically, block diagram 608 depicts a set of matrices and vectors gradually reducing within a learning architecture to a final decision (e.g., custom content 606).

Figure 7:
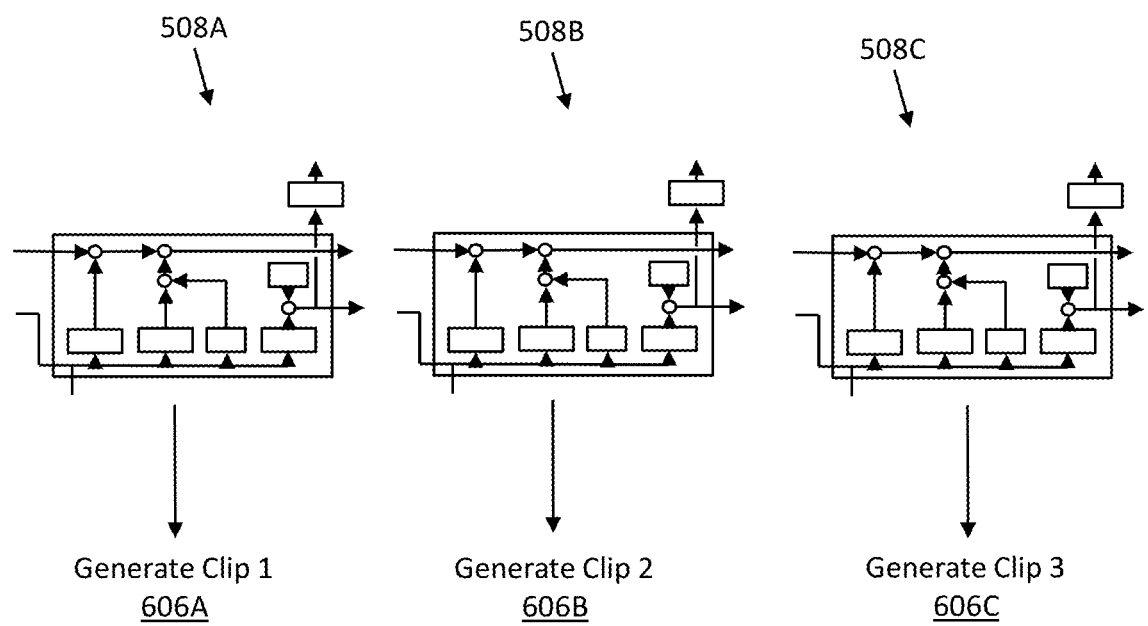
FIG. 7 illustrates the assembling of video clips in accordance with embodiment of the invention.

FIG. 7 illustrates the assembling of video clips in accordance with embodiment of the invention. Stacked LSTMS 508A, 508B and 508C are depicted as generating acceptable portions of content 606A, 606B and 606C. In embodiments, the video editing server 60 utilizes stacked (e.g., LSTMs 508A-508C) to produce clips (e.g., acceptable portions of content 606A-606C) together, so that the video editing server 60 remembers a previously generated scene, resulting in a flow of scenes.

Based on the above, it can be understood that embodiments of the invention advantageously perform audio/video editing in real-time, thus reducing the need to produce and store multiple fixed version of audio/video content for distribution to users. In embodiments, the content output of the video editing server 60 is customized based on user settings, viewer preference analysis, inspection of content and related data, and learning analysis over many groups. Thus, a user can watch the full version of a video, or the highly edited version, or any version in-between, since they can control the edits with much finer detail.

Moreover, embodiments of the invention enable a user to adjust settings in real time, so they can watch an edited scene, then rewind, adjust settings, and watch the scene unedited. In aspects, the system also provides customized editing for different user groups and individual viewers. What is considered obscene or offensive in one culture, may be less so in another. A viewer may change preferences over time and can inform the system through settings and actions. By understanding the audience through user settings, and learning how different groups react to different content, edits of the video editing server 60 can be better targeted to the audience while maintaining as much original content as possible. The edited content produced by the video editing server 60 can also be improved over fixed versions. By continuing to learn and adapt, and as technical advancements are made, the video editing server 60 is configured to generate edits that can continue to improve over time.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamically providing customized versions of video content. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In embodiments, methods of the present invention comprises: monitoring user behavioral responses (e.g., facial expressions, social media posts) to train portions of one or more audiovisual streams; generating, based on the responses, a training user response vector for each training portion; training, using the training response vectors, an artificial neural network to detect unwanted portions of content; monitoring user behavioral response to real-time portions of the real-time audiovisual stream; generating, based on the responses; a real-time user response vector for each real-time portion; analyzing, using the trained artificial neural network, the real-time user response vectors; detecting, based on the analysis, an unwanted real-time portion of content; and censoring the unwanted real-time portion of content by splicing a replacement portion of content in place of the unwanted real-time audiovisual stream. In aspects, the unwanted real-time portion of content is sound that is too muffled to be heard properly, wherein the replacement portion of content is a pre-recorded version of the sound that is clearer, and therein a director of the video stream is notified of the censoring action so that action can be taken to correct the issue going forward in the audiovisual stream (e.g. by fixing the microphone that made the muffled sound).

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    analyzing, by a computing device, a video to determine content of portions of the video and context of the portions of the video;
    assigning, by the computing device, one or more content editing categories to the portions of the video based on the analyzing;
    determining, by the computing device, an unwanted scene of the video based on the one or more content editing categories and user profile data of a viewer;
    determining, by the computing device, an acceptable portion of content corresponding to the unwanted scene;
    dynamically selecting, by the computing device, a style component for the acceptable portion of content based on context of the unwanted scene and the user profile data, wherein the style component is based on an objective of the unwanted scene;
    creating, by the computing device, custom content to replace the unwanted scene of the video based on the acceptable portion of content corresponding to the unwanted scene and the style component;
    editing, by the computing device, the video to replace the unwanted scene of the video with the custom content to produce an edited video including the custom content; and
    providing, by the computing device, the edited video to the viewer.

2. The computer-implemented method of claim 1, further comprising receiving, by the computing device, user profile data from a plurality of users, including the user profile data of the viewer, and saving the user profile data in a user profile database.

3. The computer-implemented method of claim 1, wherein the analyzing the video comprises analyzing audio data of the video and image data of the video for the content of the video and the context of the video, wherein the analyzing is performed utilizing at least one of the tools selected from the group consisting of: speech to text tools, natural language processing tools, and visual recognition tools.

4. The computer-implemented method of claim 1, further comprising receiving, by the computing device, real-time user feedback data from a viewer watching the video, wherein the real-time user feedback data indicates reactions of the viewer to the video, and wherein the determining the objectionable portion of the video comprises utilizing the real-time user feedback data to determine the objectionable portion.

5. The computer-implemented method of claim 4, wherein the real-time user feedback data comprises wearable device data of the viewer.

6. The computer-implemented method of claim 1, further comprising:
    receiving, by the computing device, an adjustment to a user setting from the viewer;
    rewinding, by the computing device, the video; and
    presenting, by the computing device, the video in an unedited form to the viewer based on the adjustment to the user setting.

7. The method of claim 1, further comprising learning, by the computing device, whether the style component for a group of replacement images of the acceptable portion of content matches the objective of the unwanted scene through backpropagation training of a neural network of the computing device.

8. A computer program product comprising a computer readable storage medium having program instructions embodied therewith, the program instructions executable by a computing device to cause the computing device to:
    feed quantitative user feedback data of a viewer of a video to a convolutional neural network of the computing device to produce a user feedback vector;
    feed qualitative user feedback data of the viewer to an encoder to produce word encodings;
    feed the word encodings and the user feedback vector into a series of long-short term memory networks to produce a user experience vector;
    feed the user experience vector to a second convolutional neural network;
    utilizing an output from the second convolutional neural network, determine an objectionable portion of the video with respect to the viewer;
    determine a style component of the objectionable portion of the video;
    generate custom content to replace the objectionable portion of the video based on an acceptable portion of content corresponding to the objectionable portion of the video and the style component; and
    edit the video to replace the objectionable portion of the video with the custom content to produce an edited video including the custom content.

9. The computer program product of claim 8, further comprising program instructions to cause the computing device to:
    analyze the video to determine content of portions of the video and context of the portions of the video; and
    assign one or more content editing categories to the portions of the video based on the analyzing.

10. The computer program product of claim 9, wherein the analyzing the video comprises analyzing audio data of the video and image data of the video for the content and the context.

11. The computer program product of claim 9, wherein the analyzing the video is performed utilizing at least one of the tools selected from the group consisting of: speech to text tools, natural language processing tools, and visual recognition tools.

12. The computer program product of claim 8, further comprising program instructions to cause the computing device to:
receive user profile data from a plurality of users, including the viewer, and save the user profile data in a user profile database; and
utilize the user profile data in the determining the objectionable portion of the video with respect to the viewer.

13. The computer program product of claim 8, further comprising program instructions to cause the computing device to:
provide the edited video to the viewer; and
receive real-time user feedback from the viewer, wherein the real-time user feedback indicates reactions of the viewer to the edited video, and wherein the determining the objectionable portion of the video comprises utilizing the real-time user feedback to determine the objectionable portion.

14. The computer program product of claim 13, wherein the real-time user feedback comprises biometric data of the viewer.

15. The computer program product of claim 8, further comprising program instructions to cause the computing device to:
provide the edited video to the viewer;
receive an adjustment to a user setting from the viewer;
rewind the video; and
present the video to the viewer without the custom content based on the adjustment to the user setting.

16. A system comprising:
a processor, a computer readable memory and a computer readable storage medium associated with a computing device;
program instructions to provide a video to a viewer;
program instructions to determine an unwanted portion of the video, as the video is being provided to the viewer, based on one or more content editing categories assigned to portions of the video and user data of the viewer;
program instructions to determine an acceptable portion of content corresponding to the unwanted scene;
program instructions to dynamically select a style component for the acceptable portion of content based on context of the unwanted portion of the video and the user data, wherein the style component is based on an objective of the unwanted scene;
program instructions to create custom content to replace the unwanted portion of the video based on the acceptable portion of content corresponding to the unwanted portion of the video and the style component; and
program instructions to provide the custom content to the viewer in real-time,
wherein the program instructions are stored on the computer readable storage medium for execution by the processor via the computer readable memory.

17. The system of claim 16, further comprising:
program instructions to analyze the video to determine content of portions of the video and context of the portions of the video; and
program instructions to assign the one or more content editing categories to the portions of the video based on the analyzing.

18. The system of claim 16, further comprising:
program instructions to receive user feedback data from a plurality of users; and
program instructions to update the one or more content editing categories based on the user feedback data from the plurality of users.

19. The system of claim 16, further comprising:
program instructions to receive real-time user feedback data from the viewer watching the video, wherein the real-time user feedback data indicates reactions of the viewer to the video; and
program instructions to feed the real-time user feedback data through an artificial neural network;
wherein the determining the unwanted portion of the video is further based on an output of the artificial neural network.

20. The system of claim 19, further comprising program instructions to train the artificial neural network over time utilizing the real-time user feedback data, wherein the training includes learning whether the style component for a group of replacement images of the acceptable portion of content matches the objective of the unwanted scene through backpropagation.

* * * * *